United States Patent Office 3,297,537
Patented Jan. 10, 1967

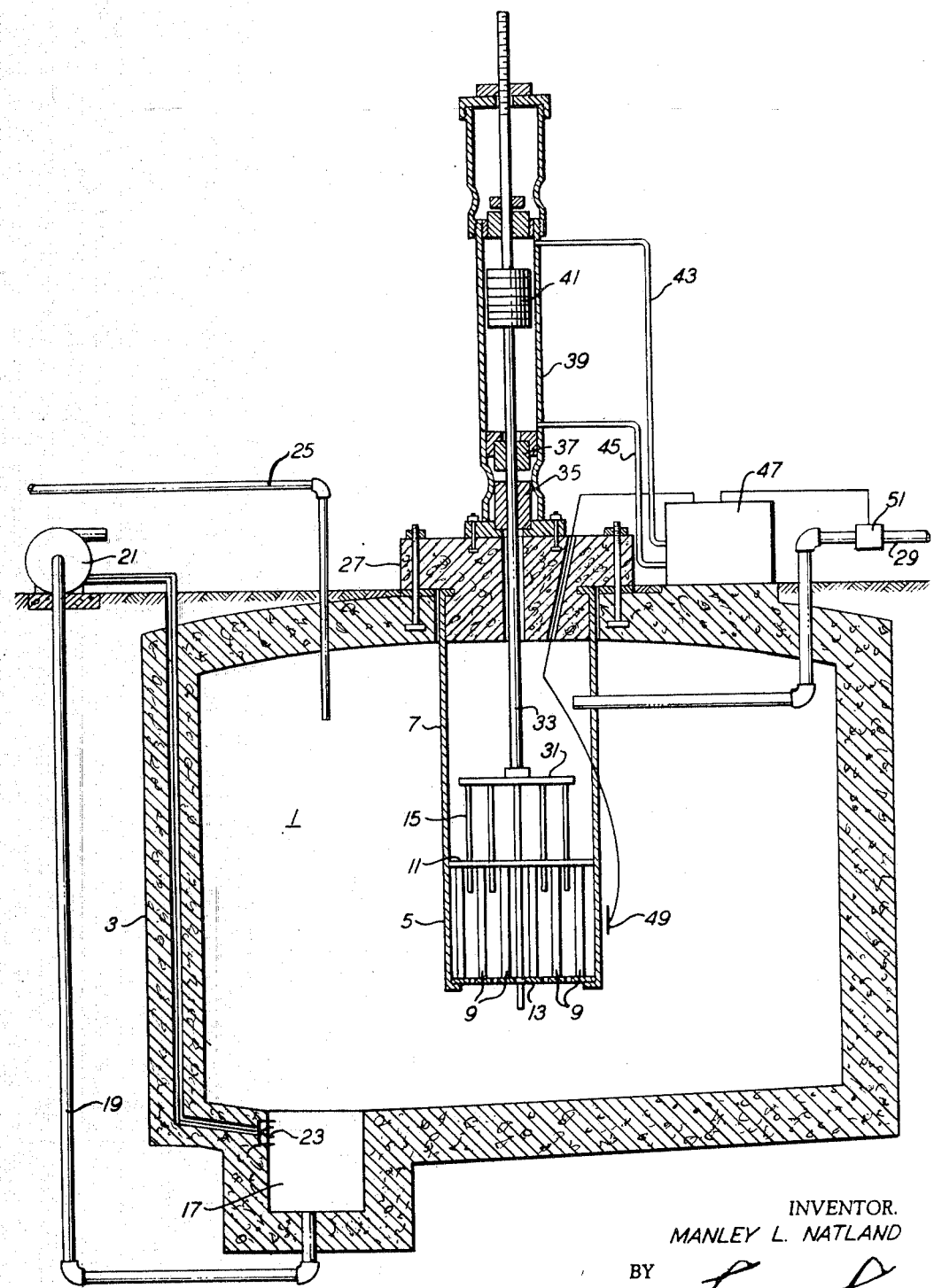

3,297,537
CRUDE PETROLEUM TRANSMISSION SYSTEM
Manley L. Natland, Rolling Hills, Calif., assignor to Richfield Oil Corporation, Los Angeles, Calif., a corporation of Delaware
Original application May 5, 1958, Ser. No. 733,151. Divided and this application Sept. 23, 1963, Ser. No. 310,839
5 Claims. (Cl. 176—22)

The present application is a division of my U.S. application Serial No. 733,151, filed May 5, 1958, now abandoned.

The present invention relates to heating and consequently reducing the viscosity of crude petroleum oil in order to facilitate the movement thereof. More particularly, the present invention pertains to apparatus for heating such oils by the use of controlled self-sustained neutronic reaction means.

The recovering and handling of crude petroleum oils is, in many cases, substantially affected by the viscosity of the fluid, the lower the viscosity the greater the difficulties in both recovering and transporting, and especially is this true if the fluid, after recovery from a subsurface oil-containing formation must be transported over considerable distances. For instance, in many cases, the petroleum as recovered can have viscosities as low as about 5 to 15 degrees API gravity and as such is inherently unsuited for pipeline transmission and at best is only difficultly flowable under the application of pressures. Furthermore, such oils, even within the earth formation are difficultly recoverable due to the tendency of foreign substances or impurities in the petroleum and of the petroleum itself to clog and plug up the interstitial spaces in the formation. Various arrangements have been proposed to improve or reduce the viscosity of such oils both in order to facilitate the pipeline transmission thereof. Usually, these arrangements have included providing heating means spaced at intervals along the pipeline or providing a heating means adjacent the formation from which the oil is to be recovered. The present arrangement is directed along these same general lines utilizing, however, an improved and novel apparatus for accomplishing the heating of the petroleum oil and thereby reducing its viscosity.

In general terms the present invention involves passing the crude petroleum oil which is to be heated and thus rendered less viscous, into contact with and through a controlled self-sustained neutronic reaction means, the petroleum in passing through the neutronic reaction means acting as a neutron moderator and coolant to remove the heat of fission generated in the nuclear reaction and as a consequence an increase in the temperature of the petroleum results and in that limited regard uses novel teachings disclosed in my U.S. Letters Patent 3,080,918 patented March 12, 1963. The amount of heat removed from the reaction and thus the temperature to which the petroleum is raised is dependent primarily upon the power output of the reactor and thus the temperature to which the petroleum is raised is dependent primarily upon the power output of the reactor and the velocity of the petroleum therethrough. For instance, if the flow of petroleum through the reactor is adjusted to about 1000 barrels per hour the reactor should be operated at a power output of about 500 kw. in order to raise the temperature of the petroleum from about 80 degrees F. up to about 180 degrees F. Much higher temperatures, of course, can be provided if desired as by suitable modifications of the reactor to give increased power outputs. For instance, the mass of fissionable material in the reactor can be increased to such an extent that temperatures of the order of 1200 degrees F. or higher are obtained within the reactor. Normally, however, the temperature will usually not exceed about 700 degrees F.

The neutronic reactors which are utilized in the instant invention are those commonly denominated as thermal heterogeneous or epithermal heterogeneous reactors. That is, they are those reactors wherein the fissionable fuel is present within the reactive core as solid slugs or bodies in contrast to slurries and the fission within the fissionable mass proceeds largely by the utilization of thermal neutrons, i.e. neutrons whose velocities have been reduced to the thermal equilibrium of the system, in contrast to fast fission neutrons. Some fast neutrons are used, however, in thermal reactors.

It is generally known that certain atomic nuclei e.g. U233, U235, PU239, can be caused to undergo nuclear fission upon the absorption of neutrons and that each such fission results in the production of 2 to 3 additional neutrons, some of which are in turn capable of being absorbed in other fissionable nuclei, and this, in addition to the release of enormous amounts of energy in the form of heat during the fission process. Thus, due to this release of additional neutrons in each fission, it becomes obvious that if the neutrons produced by each fission can be made to cause new fissions in such amounts that the neutron generation from each fission overcomes the neutron losses from the system, the reaction can be divergent to the extent desired and as a result the rate of energy release can be continued over an extended period of time and in a relatively constant manner. The neutrons produced as a result of the fission have exceedingly high energy levels, i.e. 1 to 3 million electron volts (mev.) and as a result have a comparatively short mean free path. Hence the probability of capture by other fissionable nuclei is greatly reduced unless the fissionable nuclei are present in high concentrations. It has been determined, however, that slow neutrons or neutrons in thermal equilibrium with the system have a much greater mean free path (neutron cross section) and are much more prone to capture and absorption by the fissionable nuclei. Thus, if slow neutrons are used to cause the fission reaction, the ratio of fissionable material to non-fissionable material, i.e. the percent of U235 enrichment in the fuel element necessary to bring about a self-sustained reaction can be greatly reduced.

If, therefore, a system is to be operated using reduced concentrations of fissionable material in the fuel, there must be means provided in the system for reducing the thermal energies of the fission neutrons to the point at which they become more easily absorbed in the fissionable nuclei. Not only, of course, must such a material be capable of reducing the energies of the neutrons in a small space of time but also, the slowing down material must be of such a character (i.e. its neutron cross section must be such) that it will not itself poison the system by absorbing large numbers of the neutrons and thus remove them (the slow neutrons) from the system. Such slowing down or moderation has, in the past, been accomplished by providing materials such as water, heavy water, graphite, beryllium and, in some cases, refined hydrocarbons such as polyphenyl or terphenyl; any of the above moderators being suitably positioned in and around the fissionable nuclei.

As noted above, each fission produced additional neutrons which are in turn capable of producing other fissions in other nuclei. On the average, there are produced somewhere in the neighborhood of two to three neutrons in each fission. Thus, if each neutron produced as a result of fission causes fission in two additional nuclei, there will be an exponential rise in neutron densities within the system. Such a rise, if allowed to proceed uncontrolled, can result, in a matter of seconds, in such neutron densities or fluxes that enormous amounts of energy will be released almost spontaneously and in such intensities that explosive results may be achieved. It is, therefore, readily apparent that if some control is to be exercised over the fission reaction, a part of the fission neutrons must be removed from the system and the densities of the neutrons must be reduced to such a level that the number of neutrons produced as a result of fission will only be equal to that amount necessary to maintain a controlled self-sustained reaction. Thus, the neutron density at any given time should not be allowed to materially exceed unity. In order to bring about this neutron control various materials, e.g. cadmium and boron, exhibiting a strong neutron capture cross-section have been introduced into the reactive core, and by proper manipulation of such materials the neutron densities can be maintained at the desired level.

Also, as mentioned previously, each nuclear fission produces large amounts of energy in the form of heat. This heat tends to build up in the reactive core and if left to accumulate, can result in the destruction of the geometry of the system and the deterioration of the chain reaction. It has, therefore, been found advantageous to provide some means to remove all or a part of the heat thus formed, from the system. In order to accomplish this heat removal, various coolant fluids such as air, water, liquid sodium, mercury, etc. have been passed in heat exchange relationship through the interior of the reactor and around the fissionable elements.

Now in accordance with the present invention I have devised apparatus for heating and reducing the viscosity of crude petroleum oils in order to facilitate the movement thereof. Briefly, a reactor core is placed in a special shielded container through which is passed the crude petroleum oil to be treated between and in heat exchange relationship with the fissionable fuel elements in the reactive core of a nuclear reactor of the thermal or slow type. The fissionable elements of the reactor are arranged in such a manner that the petroleum in passing therethrough serves as the moderating material to accomplish the thermalization of the fast fission neutrons and also as a coolant to remove a part of the heat of the nuclear reaction. The petroleum on exiting from the reactor can be increased in temperatures by as much as several hundred degrees F., for instance, up to about 1200 degrees F., and preferably to about 200 to 700 degrees F., thus rendering it far more easily flowable. The container is of special construction with associated controls for controlling the temperature of the reactor and eliminating deleterious effects of certain materials in the oil otherwise present in the reactor.

The above-described apparatus can best be illustrated by reference to the drawing.

Referring now to the drawing, I have shown a nuclear reactor designated generally as 1. The reactor is comprised of a concrete tank 3, the walls of which can be of any thickness found convenient provided, however, that they effectively shield the nuclear reactor. For instance, the walls can be about 5 feet thick and a layer of radiation absorbing material such as lead can surround the concrete chamber. Reactor 1 is preferably located below the surface of the earth in order to minimize radiation hazards. It can, of course, be situated partially or wholly above the surface of the earth if desired. Disposed centrally within tank 3, I have provided a reactive core 5 fixedly suspended from tank 3 as by hangers 7. Reactive core 5 can contain a mass of fissionable material such as U235 in amounts sufficient to provide a mass somewhat greater than the critical mass and the mass will be arranged in such a geometry and have a critical size such that a self-sustained chain reaction can be effected. For instance the reactive core can be composed essentially of a lattice of fuel elements 9 arranged in a square having sides of about 12 inches and a height of about 24 inches. The core can be comprised of about 20 fuel elements 9 spaced equidistant center-to-center in the cube and each individual fuel element can contain about 30 to 40 grams of enriched uranium (90% U235). The fuel elements can be composed of thin plates of uranium-aluminum alloy clad in aluminum 3 inches in width and 24 inches in height. Thus, each of the plates could contain about 8 grams of 90% U235 and 5 plates can be bound together as with an aluminum jacket to form an element. The fuel elements 9 can be held in position as by retaining plates 11 and 13. Plates 11 and 13 have openings therethrough for the ingress and egress of the moderator-coolant into and through the reactive core and upper plate 11 has further provided additional openings for the movement of control rods 15 into and out of the lattice of fissionable elements 9. The volume of tank 3 can be any found convenient. Due, however, to the desirability of maintaining a reflective shield around the reactive core in order to minimize neutron losses from the system it is advantageous to provide tank 3 of at least a sufficient volume to allow a space between walls of tank 3 and reactive core 5 sufficient to contain the desired amount of neutron reflecting material. For instance, in the present case, the reflecting material will be the crude petroleum so the space can be about 24" or greater on all sides of the reactive core 5.

In the illustration given, tank 3 is provided with a water and salt water collection well 17 at the bottom thereof. Thus, any water which enters tank 3 either with the petroleum or otherwise can be removed therefrom as by pipe 19 and pump 21. If desired, pump 21 can be activated by a water-level switch positioned as at 23 near the top of the water well 17, such water level switch for example having contacts that are conductively connected together via the water or salt water to cause operation of the pump and cause water to be removed via line 19 and pump 21.

The crude petroleum which serves as the reactor moderator, coolant and reflector can enter the reactor 1 as through pipe 25 leading into the top thereof. The petroleum is removed from the reactor 1 as by egress pipe 29 extending downwardly through the top of tank 3 and above reactor core 5.

In order to effect the control of the rate of fission and ultimately the temperature of the petroleum egressing from the reactor 1, I have provided a series of control rods 15 fabricated of boron 10 carbide or some similarly acting material. These control rods 15 can be arranged in any conventional manner for insertion into the reactive core 5 and they can be activated by any suitable means in order to accomplish this purpose. As here shown, the control rods 15 are suspended from plate 31 which is in turn connected to shaft 33 slidably insertable into reactor 1 as through a central opening in cap 27. Shaft 33 extends upwardly through cap 27 and through packing glands 35 and 37 and into cylinder 39. Affixed to the upper portion of shaft 33 is piston 41 operable within cylinder 39. Fluid flow lines 43 and 45 are provided above and below piston 41 and are in communication with a reverse cycle pump 47. Pump 47 can be activated as by a solenoid (not shown) or other similar device in electrical communication with a thermocouple within a thermowell located at any convenient position in reactor 1 as at 49 and thus withdraw or force fluid above or below piston 41 in order to move shaft 33 and rods 15. If desired, an additional thermocouple can be provided as at 51 in order to monitor the temperature of the petroleum leaving the reactor as by line 29. Of course, other arrangements can be provided to control the movement of the rods 15 into and out of the fissionable lattice such as a rack and pinion gear or similar mechanical contrivances and the intensity of the fission reaction can be measured by means other than the temperature produced by the fission reaction. For instance, a conventional ionization chamber could be provided which can in turn be correlated to the power output of the reactor.

The above-described arrangement can be used to effect the present method in the following manner. The crude petroleum, as recovered from the oil field, is conducted into the reactor by means of pipe 25 and flows into reactor 1. During the filling of the reactor the control rods 15 are fully inserted into the fissionable core 5 in order to maintain the neutron densities within the fissionable mass below unity and thus to prevent the possibility of establishing a premature self-sustained reaction. When the reactor has become completely filled with crude petroleum there will be sufficient petroleum in the channels between the fissionable elements in the lattice to effectively moderate the fission neutrons and the layer of petroleum surrounding the lattice will serve as a reflector to lessen the loss of neutrons from the system due to escape. Even at this point, however, a self-sustained reaction will not be initiated due to the presence of the poisoning material, i.e. control rods 15 in the core 5. Thus, in order to achieve a self-sustained reaction and hence a constant source of heat the control rods must be withdrawn from the fissionable mass. As the control rods are withdrawn the rate of fission will increase and the temperature of the petroleum in the reactor will be correspondingly raised as it is in heat exchange relationship with the core 5. When the petroleum has attained a temperature sufficient to reduce its viscosity to the desired extent, i.e., 200 degrees F., a valve in output line 29 can be opened and the flow of petroleum started as by pumping. At this point the input flow by way of line 25 and the output flow by way of line 29 can be stabilized so as to achieve a steady rate of flow through the reactor. For instance, if the viscosity of the input petroleum is about 5 to 15 API degrees gravity and is at a temperature of about 80 degrees F., the petroleum flow through can be adjusted at about 1000 bbls./day with the reactor operating at a power output of about 500 kws. Under these conditions the petroleum exiting through line 29 will have a temperature of about 180 degrees F. and its viscosity will be improved to such an extent that it is much more easily flowable or pumpable. The power output of the reactor and hence the temperature thereof can be regulated by suitable adjustments of the control rods. For instance, if the temperature of the petroleum egressing from the reactor is above a predetermined maximum level the thermocouple 49 will transmit the temperature to a temperature-responsive device located at the pump 47. The temperature-responsive device will activate a solenoid which will, in turn, activate the pump 47, withdrawing fluid from beneath piston 41 and thereby lowering the control rods 15 into the fissionable lattice thus stopping or slowing down the fission reaction and lowering the temperature. Conversely, if the temperature of the petroleum falls below a predetermined minimum level the reverse pattern will be followed so as to raise piston 41 and control rods 15 from the fissionable lattice and thus increase the rate of fission and the temperature. In this manner, the temperature of the petroleum and hence its viscosity can be controlled to any desired extent.

Although I have only shown and described one such nuclear reactive system, it is to be understood that in the pipeline transmission of such fluids, it may be necessary or desirable to space several such heating stations along the pipeline route. For instance, when the petroleum egresses from the reactor, it will have a sufficient temperature to render it easily pumpable. However, due to heat losses in the pipeline, the temperature and, therefore, the viscosity of the petroleum as it progresses may be reduced to such an extent that it becomes once again difficulty pumpable. At this point another similar reaction means could be installed and the temperature of the petroleum again increased.

As indicated previously, the present method is not confined to the facilitation of the above-surface transportation of such crude petroleum fluids but it can also prove beneficial in assisting the recoveries of such fluids from subsurface formations. For instance, if the petroleum in the formation is of such a viscosity that it cannot be readily moved through formation and up the bore holes to the surface, e.g. as in the case of the Athabasca tar sands, I can position nuclear reactors substantially of the general type above described in the bore holes and, if desired, adjacent to the oil-bearing formation and thus effect an improvement in the viscosity of the petroleum both in the formation and in the bore hole.

When operating in this manner the method can also involve pumping a crude petroleum contained in a reservoir at the earth's surface down a tubing string suspended in a well bore traversing the oil-bearing formation through a nuclear reactor positioned in the tubing string and thence outwardly into the oil-bearing formation adjacent the well bore using teachings in my pending U.S. application S.N. 639,001 filed February 8, 1957, now U.S. Patent 3,127,319, issued March 31, 1964 and in my U.S. Patent 3,080,918 issued March 12, 1963 on an application Serial No. 681,097 filed August 29, 1957. The oil during its passage through the reactor flows between the fissionable elements and in heat exchange relationship therewith so as to act as a reactor moderator and coolant and carry away heat produced by the nuclear fission taking place within the reactor. The petroleum heated in this manner passes into the formation wherein it serves to heat and render less viscous the oil contained therein. The petroleum introduced into the formation and at least a portion of that originally in the formation can be forced or driven by the injected oil to an output well in which can also be suspended, if desired, a tubing string having a similar nuclear reactor positioned therein for heating the recovered oil and reducing its viscosity to facilitate transportation to the earth's surface. The oil recovered from the output well can be directed to the reservoir tanks for recirculation back through the input well and the formation or all or a portion thereof can be drawn off for transmission along the pipe lines 25 and 29 as described above with the oil being again used as the moderator and coolant for the reactor 1.

I claim:

1. In a crude petroleum long distance transmission system, the combination comprising, an inlet transmission line, an outlet transmission line, a neutronic reactor having a crude petroleum receiving tank serving as a shield for the reactor, said tank having an inlet and an outlet connected respectively to said inlet transmission line and said outlet transmission line for the flow of crude petroleum through said reactor, means including said crude petroleum for effecting a controlled self-sustained thermal neutronic reaction in said reactor, said reaction means including spaced apart fissionable elements to heat said crude petroleum while serving both as a coolant and moderator for the reactor, said inlet transmission line being a part of a long distance transmission line and extending from a first remote location and delivering crude petroleum therefrom to said tank, said outlet transmission line being part of said long distance transmission line and extending to a second remote location different from said first remote location and conveying said crude petroleum to said second location from said reactor tank after said crude petroleum flows from said inlet transmission line, through said reactor to cool and moderate said reactor and then into said outlet transmission line wherein the crude petroleum is then in a condition heated by said reactor to a sufficiently high temperature to facilitate movement of said crude petroleum along said outlet transmission line.

2. A combination as set forth in claim 1 in which said reaction means includes movable control means for establishing the extent of said reaction, temperature responsive means in said tank and responsive to the temperature of the oil in said reactor, and means operated by said temperature responsive means for positioning said movable control means.

3. A combination as set forth in claim 1 in which said reaction means is ineffective to produce a self sustained reaction in the absence of oil in said reactor occasioned by a break in said transmission line.

4. A combination as set forth in claim 1 in which means are located within and near the bottom of said tank for sensing the presence of water in said tank, and means operated by said sensing means for removing said water from said tank and said transmission line.

5. Apparatus useful in the transmission of oil along a pipeline, an inlet transmission line, an outlet transmission line, a neutronic reactor having an oil receiving tank serving as a shield for the reactor, said tank having an inlet and an outlet connected respectively to an inlet transmission line and said outlet transmission line for the flow of oil through said reactor, means for effecting a controlled self-sustained thermal neutronic reaction in said reactor, said reaction means including spaced apart fissionable elements to heat said oil while serving both as a coolant and moderator for the reactor and means located within and near the bottom of said tank for sensing the presence of water in said tank, and means operated by said sensing means for removing said water from said tank and said transmission line, said sensing means being within a well formed contiguous with and at the bottom of said tank

References Cited by the Examiner
UNITED STATES PATENTS

| | | | |
|---|---|---|---|
| 2,119,348 | 5/1938 | Parsons | 210—114 |
| 2,325,925 | 8/1943 | Waugh | 210—114 |
| 2,375,428 | 5/1945 | Marsh | 210—114 |
| 2,533,878 | 12/1950 | Clark | 137—13 |
| 2,951,943 | 9/1960 | Goodman | 176—22 X |
| 2,951,946 | 9/1960 | Frey et al. | 176—22 X |
| 2,954,334 | 9/1960 | Stoops et al. | 176—39 X |

FOREIGN PATENTS

| | | |
|---|---|---|
| 697,601 | 9/1953 | Great Britain. |
| 708,901 | 5/1954 | Great Britain. |

OTHER REFERENCES
M. A. Schultz: Control of Nuclear Reactors and Power Plants, 1955, pages 109–112, 145–148.

REUBEN EPSTEIN, *Primary Examiner.*